United States Patent [19]

Jacobsen

[11] 4,358,045
[45] Nov. 9, 1982

[54] TIP POSITIONING BRAZING FIXTURE

[76] Inventor: George H. Jacobsen, 18241 NE. Cedar Dr., Battleground, Wash. 98640

[21] Appl. No.: 175,721

[22] Filed: Aug. 13, 1980

[51] Int. Cl.³ .............................................. B23K 37/04
[52] U.S. Cl. ................................ 228/49 R; 76/25 R; 76/80; 169/40
[58] Field of Search ................ 228/6 R, 44.1 R, 49 R; 76/25 R, 74, 79, 101 A, 112; 269/37, 40

[56] References Cited

U.S. PATENT DOCUMENTS

| 2,673,279 | 3/1954 | Drake | 228/6 R X |
| 2,823,295 | 2/1958 | Wilcox | 219/86.33 |
| 3,613,211 | 10/1971 | Daggett | 228/49 R X |
| 3,960,310 | 6/1976 | Nussbaum | 228/44.1 R X |
| 4,124,157 | 11/1978 | Walker | 228/49 R |

Primary Examiner—Gil Weidenfeld
Assistant Examiner—Fred A. Silverberg
Attorney, Agent, or Firm—Klarquist, Sparkman, Campbell, Leigh, Whinston & Dellett

[57] ABSTRACT

A brazing fixture having an arrangement for indexing the teeth of a saw blade successively into register with a laying block. The block is so constructed as to accurately locate the pre-top-ground tips on successive teeth so that the tips can be brazed to the teeth with their cutting edges in a common circle about the axis of the saw blade. The invention also contemplates a method of providing a saw blade with the cutting edges of tips in a common circle comprising providing top ground tips, indexing a saw successively into register with an application zone, and at the zone abutting the cutting edges of the tips successively against a locator face and securing the tips to the teeth in such position.

1 Claim, 4 Drawing Figures

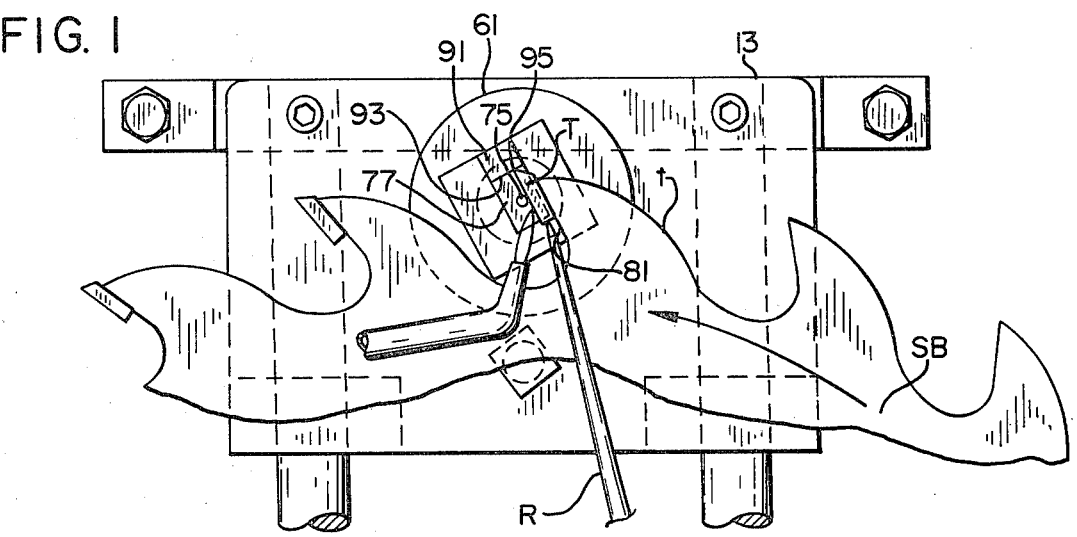
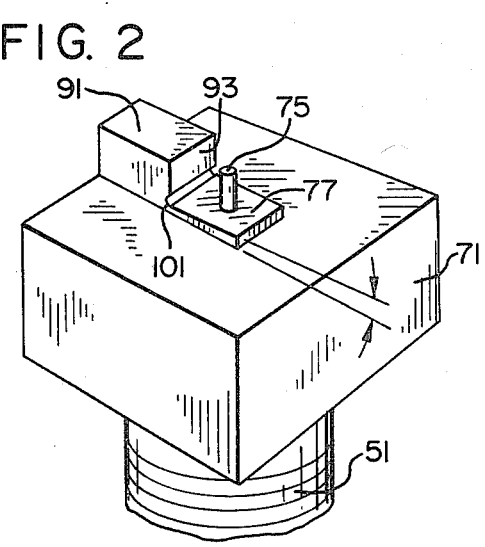
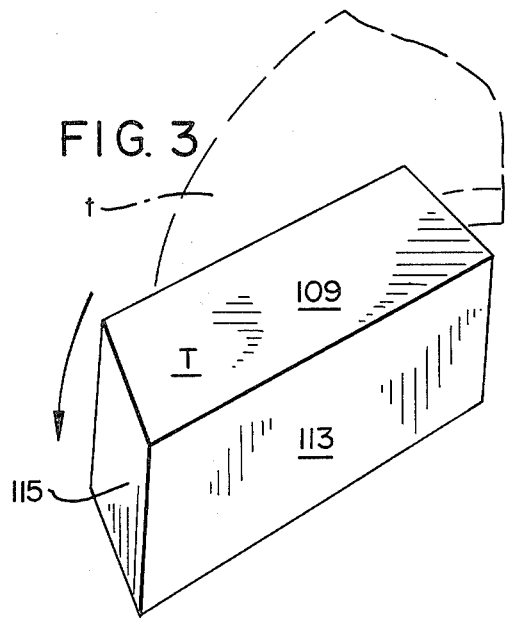
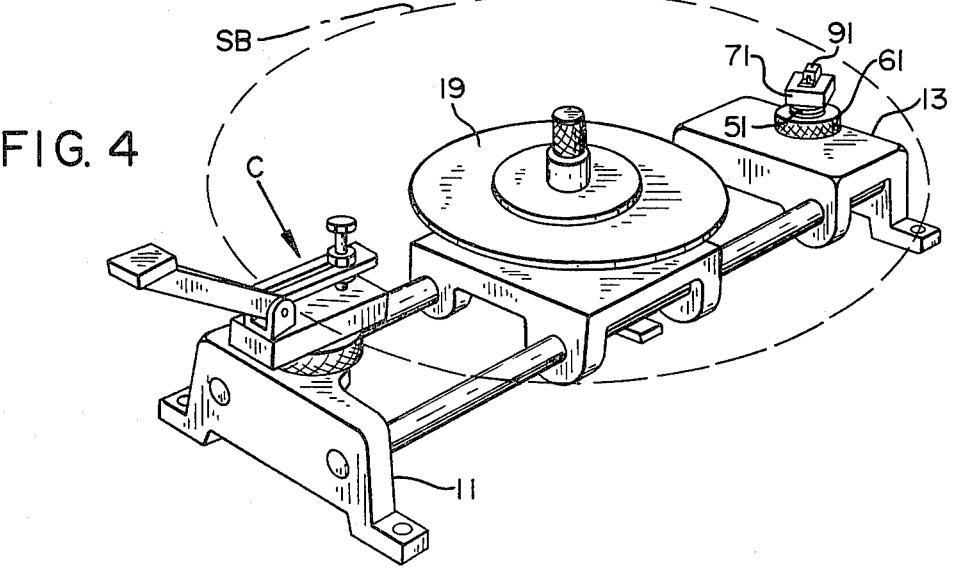

TIP POSITIONING BRAZING FIXTURE

BACKGROUND OF THE INVENTION

Prior U.S. Pat. No. 4,124,157 shows a circular saw brazing fixture designed to facilitate the ready application to the teeth of a saw of cutting tips of tungsten carbide or other hard material. Each of the teeth has a pocket or notch for receiving the associated tip.

The steps of applying a tip are as follows: it will be assumed that the holder for the saw blade has been adjusted to locate the saw teeth properly relative to a tip laying block. A tip is placed on the block and against an upstanding pin and the saw blade turned to bring the walls of the socket against the tip. The tip is now heated so that brazing material (with which the tip and the pocket) now forms a proper secure joint between the tip and the pocket walls to firmly fix the tip in place.

After the teeth are all so tipped, the saw is placed in a top grinding machine, wherein the outer peripheral surfaces of the tips are ground (called "top" grinding) so that the cutting edges of the tips are all the same distance from the axis of rotation of the saw, to assure that the cutting edges will all cut at the same depth.

The above patent is owned by Pacific Saw & Knife Company, which is supplying the brazing fixtures to its customers.

SUMMARY OF THE INVENTION

The present invention improved on the above brazing fixture by providing an arrangement which so accurately locates the cutting edges of the tips at the time of tip securement, as to permit top grinding of the tips prior to their being secured in place, so that the resulting saw has the cutting edges of the tips located just as accurately as if the tips had been secured to the saw and subsequently top ground. By this procedure, considerable time is saved because it is less time-consuming to top grind the teeth prior to application than to apply the teeth and then top grind them. Also it eliminates the necessity for the purchaser to have top grinding equipment on hand.

The present invention provides a brazing fixture generally like the fixture of the above patent, but having the laying block provided with a raised abutment against which the cutting edges of top ground tips can be positioned at the time they are brazed to the saw teeth. Since all cutting edges are accurately positioned against the raised abutment at the time of application to the saw teeth, the cutting edges will all be accurately located in a common circle about the axis of rotation of the saw.

An object of the present invention is to provide an improved brazing fixture and particularly one that enables a series of tips to be applied to the teeth of a saw with the cutting edges of the tips all accurately in touching or tangential relation to a common circle about the axis of rotation of the saw.

Another object of the invention is to provide an arrangement for securing cutting tips to the teeth of circular saws which eliminates the necessity of providing a pocket or notch, whereby to enable a tip to be applied to the plane edge of the tooth.

A further object is to provide an improved method of providing a saw blade having accurately positioned top ground tips.

Various other objects of the invention will be apparent from the following description taken in connection with the accompanying drawings, wherein:

FIG. 1 is a fragmentary plan view of a fixture incorporating the concepts of the present invention;

FIG. 2 is a perspective view of the improved laying block;

FIG. 3 is a perspective view of a carbide tip mounted on a tooth;

FIG. 4 is a perspective view of the overall improved brazing fixture.

DETAILED DESCRIPTION OF THE INVENTION

Referring to FIGS. 1 and 4, the improved fixture has a frame generally like the frame of the fixture of U.S. Pat. No. 4,124,157. As such, the frame has a pair of end standards 11 and 13 supporting a pair of parallel guide rods which in turn support a carriage or holder 19 which supports a saw blade SB in a manner to permit the saw blade to be manually indexed in a circumferential direction so that successive teeth of the saw blade can be brought into register with a laying block 71. The block is mounted on the standard 13 by an adjusting nut 51 in the manner recited in U.S. Pat. No. 4,124,157. A clamping mechanism C, as described in said patent, may be provided.

Typically, the tips T to be applied to the teeth t are usually tapered longitudinally on their side faces. Thus, the laying block 71 is provided with a ramp-like raised surface 77 to receive and support a tip T in proper position to be brazed onto the front edge 81 of the associated tooth t. The laying block has an upstanding pin 75 constituting a stop against which the tip T is pressed by the front edge 81 of the associated tooth t when the saw blade is manually indexed to bring the tooth against the tip.

In our prior patent, the teeth had notches for receiving the tips. The tips were nested in the notched portions and brazed in place by heating up brazing material, which usually was coated onto the appropriate faces of the tip prior to the brazing step. After tips had been brazed onto all of the teeth, the saw would be placed in a top grinding machine, and the tips all top ground, i.e., their peripheral surfaces ground, so that the cutting edges of the tips were all disposed at the same distance from the axis of rotation of the saw, whereby the cutting action of the tips would be the same, whereby to avoid imposing undue loading on any one tip.

With the fixture of the present invention, this subsequent top grinding operation is made unnecessary because the fixture of the present invention allows the use of tips which are top ground prior to being brazed to the teeth.

Referring to FIG. 1, the laying block has an upstanding abutment 91 having an inwardly directed locating face 93 against which the cutting edge 95 of each tip T is placed and held by a holder rod R, while the tip is being brazed to the front edge 81 of the associated tooth t. With this arrangement, the radial location of the cutting edges of the tips are determined by the engagement of the cutting edges with the locating face 93 of the abutment 91 of the laying block, rather than by the fit of the tips within notches or pockets on the teeth.

If desired, my fixture can be used with blades having notched teeth, but the tips are not fully seated on the step portions of the notches. Instead they are located within the notches but positioned so that their cutting edges are in contact with the locating face 93 of the abutment 91 of the laying block.

It is evident that if all of the tips are secured to their associated teeth in the fashion just described, their cutting edges will all be in a common circle around the axis of rotation of the saw, thus eliminating the necessity for top grinding of the tips after they have been applied to the saw blade.

There are several advantages to the improved brazing fixture. In the first place, it takes about the same time to apply to the saw, cutting tips having preground peripheral surfaces, as it does to apply tips which need subsequently to be top ground. Thus, considerable time is saved because after the blade is removed from a fixture of the present invention, no time-consuming subsequent top grinding operation need to be provided. Also, the user can do away with his top grinding equipment, or if he uses it for other purposes, the top grinding equipment will be used to a lesser extent and thus its life prolonged, inasmuch as it will be unnecessary to use it when the improved fixture of the present invention is employed.

Another saving which can be effected is that since the tips of the present invention require no shelves or steps on the tip on which the tips are to rest, the front edges of the teeth can be left plain.

FIG. 2 shows more clearly than FIG. 1 or 4 the laying block 71 mounted on the upper end of the adjustment screw 51, the inclined ramp 77 on which a carbide tooth is placed, and the pin 75 against which the tip rests. FIG. 2 also clearly shows the abutment element 91 and its vertical cutting-edge-locating face 93. At the intersection of this face and the face of the ramp 77, a curved notch 101 is provided to assure that the lower corner of a tip cutting edge does not interfere with the accurate positioning of the cutting edge against the locator face 93.

FIG. 3 shows more clearly than FIG. 1 a tooth t, and one side, 109, of its two sides that are ground, as well as the forward face 113 which is also ground. FIG. 3 further shows the peripheral surface or top 115 of the tip T is pre-top ground prior to its being applied to the tooth t.

What is claimed is:

1. A brazing fixture comprising:

a frame, means on said frame for supporting a toothed saw blade for circumferential advancement about a fixed vertical axis, tip supporting means spaced from said axis for supporting a pre-ground tip, wherein said pre-ground tip has a cutting edge and a plurality of sides, said tip supporting means including a laying block, said laying block having a generally horizontal supporting surface for supporting the tip, said laying block also having a first stationary vertical stop for contact with one of the plurality of sides of the tip to determine its lateral position, said laying block having a second stationary vertical stop which faces toward said axis for engaging the cutting edge of the tip to predispose its radial location independently of said means and independently of the saw blade, to facilitate the application of plural tips to the saw blade with all the tip ends accurately touching a circle concentric with said axis, whereby to eliminate the necessity of grinding the tip ends after application; said laying block being formed with a recess located between said supporting surface and said second vertical stop to accommodate a lower corner of the cutting edge, said first vertical stop projecting upwardly from said generally horizontal supporting surface, said first and said second vertical stops extending in the same direction.

* * * * *